(12) United States Patent
Piazza et al.

(10) Patent No.: US 7,047,565 B2
(45) Date of Patent: May 16, 2006

(54) METHOD AND SYSTEM FOR CAPTURING IN-SERVICE DATE INFORMATION

(75) Inventors: William Joseph Piazza, Holly Springs, NC (US); Sharon Lynn Sanders Fore, Apex, NC (US); Hoyt Conis Simmons, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 10/002,428

(22) Filed: Oct. 31, 2001

(65) Prior Publication Data

US 2003/0084380 A1  May 1, 2003

(51) Int. Cl.
| | |
|---|---|
| G06F 7/04 | (2006.01) |
| G06F 17/30 | (2006.01) |
| G06F 17/60 | (2006.01) |
| G06K 9/00 | (2006.01) |
| H03M 1/68 | (2006.01) |

(52) U.S. Cl. .................. 726/26; 455/411; 455/418
(58) Field of Classification Search ............ 713/200; 340/5.5
See application file for complete search history.

(56) References Cited

U.S. PATENT DOCUMENTS

| | | | |
|---|---|---|---|
| 5,608,658 A | | 3/1997 | Yao et al. |
| 5,774,058 A | * | 6/1998 | Henry et al. .............. 340/5.5 |
| 5,894,596 A | * | 4/1999 | Hayes, Jr. ................ 455/418 |
| 5,918,214 A | | 6/1999 | Perkowski |
| 5,978,774 A | | 11/1999 | Rogers et al. |
| 6,018,719 A | | 1/2000 | Rogers et al. |
| 6,058,368 A | | 5/2000 | Aourane |
| 6,094,639 A | | 7/2000 | Kubota |
| 6,128,598 A | | 10/2000 | Walker et al. |
| 6,163,693 A | * | 12/2000 | Rydbeck ................... 455/418 |
| 6,167,383 A | | 12/2000 | Henson |
| 6,182,048 B1 | | 1/2001 | Osborn et al. |
| 6,208,853 B1 | | 3/2001 | LoVasco |
| 6,240,286 B1 | | 5/2001 | Rydbeck |
| 6,529,727 B1 | * | 3/2003 | Findikli et al. ............ 455/411 |

* cited by examiner

*Primary Examiner*—Christopher Revak
*Assistant Examiner*—Arezoo Sherkat
(74) *Attorney, Agent, or Firm*—Joseph P. Lally; Martin McKinley

(57) ABSTRACT

A system and method for establishing and maintaining date information associated with an electronic device. The system is typically configured to prompt a user to enter or otherwise establish a valid date at some point after power is applied to the system. After establishing a valid date, the real time clock is configured to maintain real-time date/time information. Upon determining that a valid date has been set, the system may subsequently obtain date/time information from the real time clock and store the obtained date and time in the non-volatile memory as the in-service date. The system may be enabled to determine if, subsequent to establishing an in-service date, the user altered the date/time information in a manner that indicated an intent to extend the warranty period beyond the manufacturer specified warranty period. In an embodiment suitable for use in conjunction with a server blade, the system includes a main processor and a service processor that handles low-level functions associated with the server blade. The in-service date information may be stored in a non-volatile memory of the service processor. This non-volatile memory may be implemented as an EEPROM that includes connections or pins supporting an externally accessible bus such as an I2C bus. In this embodiment, the system may further include a readout device configured to connect to the service processor EEPROM through the externally accessible bus to enable a technician to retrieve the in-service date without regard to the functionality of the main processor(s) and system memory.

21 Claims, 4 Drawing Sheets

METHOD AND SYSTEM FOR CAPTURING IN-SERVICE DATE INFORMATION

BACKGROUND

1. Field of the Present Invention

The present invention generally relates to the field of electronic devices and more particularly to a method and system for capturing date information to establish reliably the date on which the device was first placed in service.

2. History of Related Art

Manufacturers of electronic devices frequently warrant their products for a specified time period. The specified time period, commonly referred to as the warranty period is frequently defined in terms of an "in-service" date. The in-service date is the date on which the customer first placed the device in service.

If the device malfunctions during the warranty period, the manufacturer will typically repair or replace the device at little or no cost to the customer. In large operations, warranty repairs can become a significant cost to the manufacturer. The warranty period for any given device is carefully determined by the manufacturer to control the cost of warranty repairs. The manufacturer typically determines the warranty period based on a number of factors including the expected failure rate of the device and the expected cost of an average warranty repair for the device. If the warranty period for a given device is extended, the warranty costs may significantly exceed the warranty costs projected and budgeted for the device. Accordingly, it is highly desirable to implement a system and method for determining date information, such as the in-service date, for an electronic component. It is further desirable that the implemented system and method not substantially increase the cost of the component and that the system and method is relatively immune to fraudulent manipulation by the customer while still providing sufficient flexibility to enable limited customer access to the desirable date information.

SUMMARY OF THE INVENTION

The problems identified above are in large part addressed by a system and method for establishing and maintaining real-time or date information associated with an electronic device. The system typically includes a general purpose processor having access to non-volatile storage or memory as well as a real time clock. The system is typically configured to prompt a user to enter or otherwise establish a valid date at some point after power is applied to the system. After establishing a valid date, the real time clock is configured to maintain real-time date/time information. Upon determining that a valid date has been set, the system may subsequently obtain date/time information from the real time clock and store the obtained date and time in the non-volatile memory as the in-service date.

The system would preferably further be enabled to determine if, subsequent to establishing an in-service date, the user altered the date/time information in a manner that indicated an intent to extend the warranty period beyond the manufacturer specified warranty period. In one embodiment, the user would have limited access to alter the in-service date when, for example, an operator sets the initial date information incorrectly.

In an embodiment suitable for use in conjunction with a server processor board (also referred to as a server blade), the system may include at least one main processor and a service processor that is assigned the task of handling low-level functions associated with the server blade such as monitoring power, for example. In this embodiment, the service processor may include its own dedicated volatile and non-volatile memory. The in-service date information may be stored in the service processors non-volatile memory. This non-volatile memory may be implemented as an EEPROM that includes connections or pins supporting an externally accessible bus such as an I2C bus. In this embodiment, the system may further include a readout device configured to connect to the service processor EEPROM through the externally accessible bus to enable a technician to retrieve the in-service date without regard to the functionality of the main processor(s) and system memory. In addition, storing the in-service date in a storage location that is inaccessible to the main processor(s) improves the security of the information and increases the difficulty of fraudulently altering the date.

BRIEF DESCRIPTION OF THE DRAWINGS

Other objects and advantages of the invention will become apparent upon reading the following detailed description and upon reference to the accompanying drawings in which.

Figure 1:
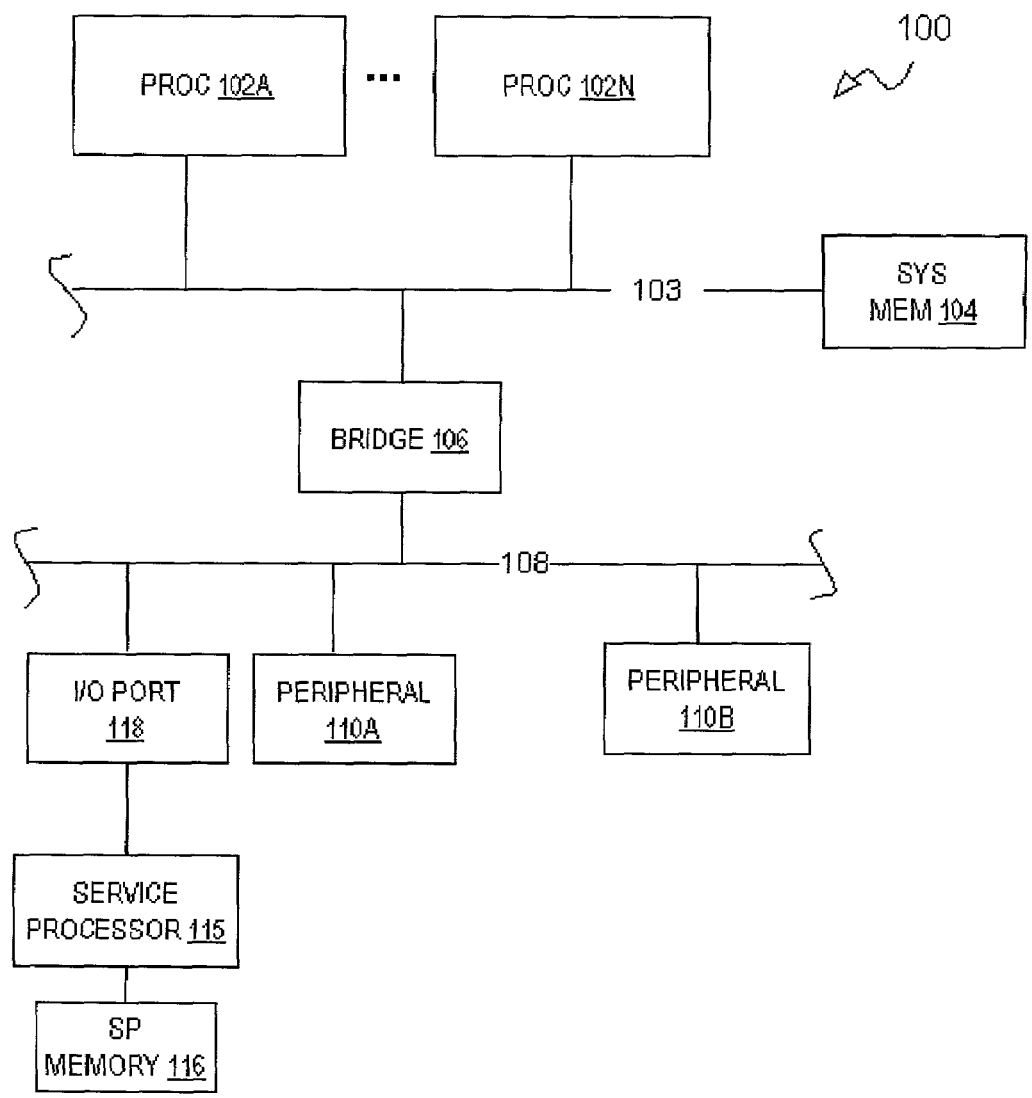
FIG. 1 is a block diagram of selected elements of a server blade suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The present invention generally contemplates a method and system for establishing and securely storing information associated with an electronic device such as the date the device was first put in service. Electronic devices frequently incorporate and make use of real time clocks that are suitable for maintaining date and time information. Microprocessors, for example, and their associated operating systems typically permit or require a user to enter the date and time for purposes such as maintaining an electronic calendar and assigning creation dates or last-modified dates to electronic documents. The present invention leverages the real-time clock capabilities found on many electronic devices to provide an automated and substantially user-transparent mechanism for establishing an in-service date and storing in an externally accessible storage location that is secure from alteration via operating system code.

Turning now to the drawings, FIG. 1 is a simplified block diagram of an electronic device or data processing system 100 that is suitable for use in one embodiment of the present invention. In the depicted embodiment, data processing system 100 includes one or more general purpose microprocessors 102A through 102N (generically or collectively referred to as processor(s) or main processor(s) 102). Processors 102 are typically implemented as general purpose microprocessors suitable for use in applications such as server system, desktop and laptop computers and so forth.

Processor(s) 102 are connected to a system bus 103 through which the processor(s) can access a system memory 104. System memory 104 is typically implemented as an array of dynamic random access memory (DRAM) devices as will be familiar to those knowledgeable in the design of microprocessor based computing systems. A bridge 106 provides an interface between system bus 103 and a peripheral bus 108 to which peripheral devices 110A and 110B (generically or collectively referred to as peripheral device(s) 110) are connected. Peripheral device(s) 110 may include graphics adapters, network adapters, hard disk controllers and various other peripheral devices. Peripheral bus 108 may comply with an industry standard peripheral bus such as the Peripheral Components Interface (PCI) bus specified by the PCI Special Interest Group.

System 100 as depicted in FIG. 1 further includes a service processor 115 connected to the main processors 102 via a general purpose I/O port 118. While one embodiment may allow for the attachment of the service processor 115 through I/O means, it is well known in the art that other techniques exist for attaching peripheral devices to a main processor. For example, the service processor could also be mapped to memory addresses accessible by the main processor.

Service processors are typically relatively inexpensive processor devices that are dedicated to support "low-level" functions of the system such as power monitoring, thermal monitoring, fan operation, and so forth. In the depicted embodiment, service processor 115 has access to a dedicated service processor memory 116, which may include volatile storage, non-volatile storage, or a combination of both.

Portions of the present invention may be implemented as a computer program product stored on a computer readable medium where the computer program product is in the form of a sequence or set of processor executable instructions for generating and maintaining date information associated. When the instructions are being executed, they may reside in a relatively fast and volatile storage medium such as the system memory 104 depicted in FIG. 1 or a cache memory (not depicted) of processor(s) 102. At other times, the instructions may reside on a non-volatile storage medium such as a hard disk, floppy diskette, CD ROM, DVD, EEPROM, flash memory card, magnetic tape, and the like. In addition, portions of the code may also reside within the Service Processor subsystem (i.e., in memory block 116).

Figure 2:
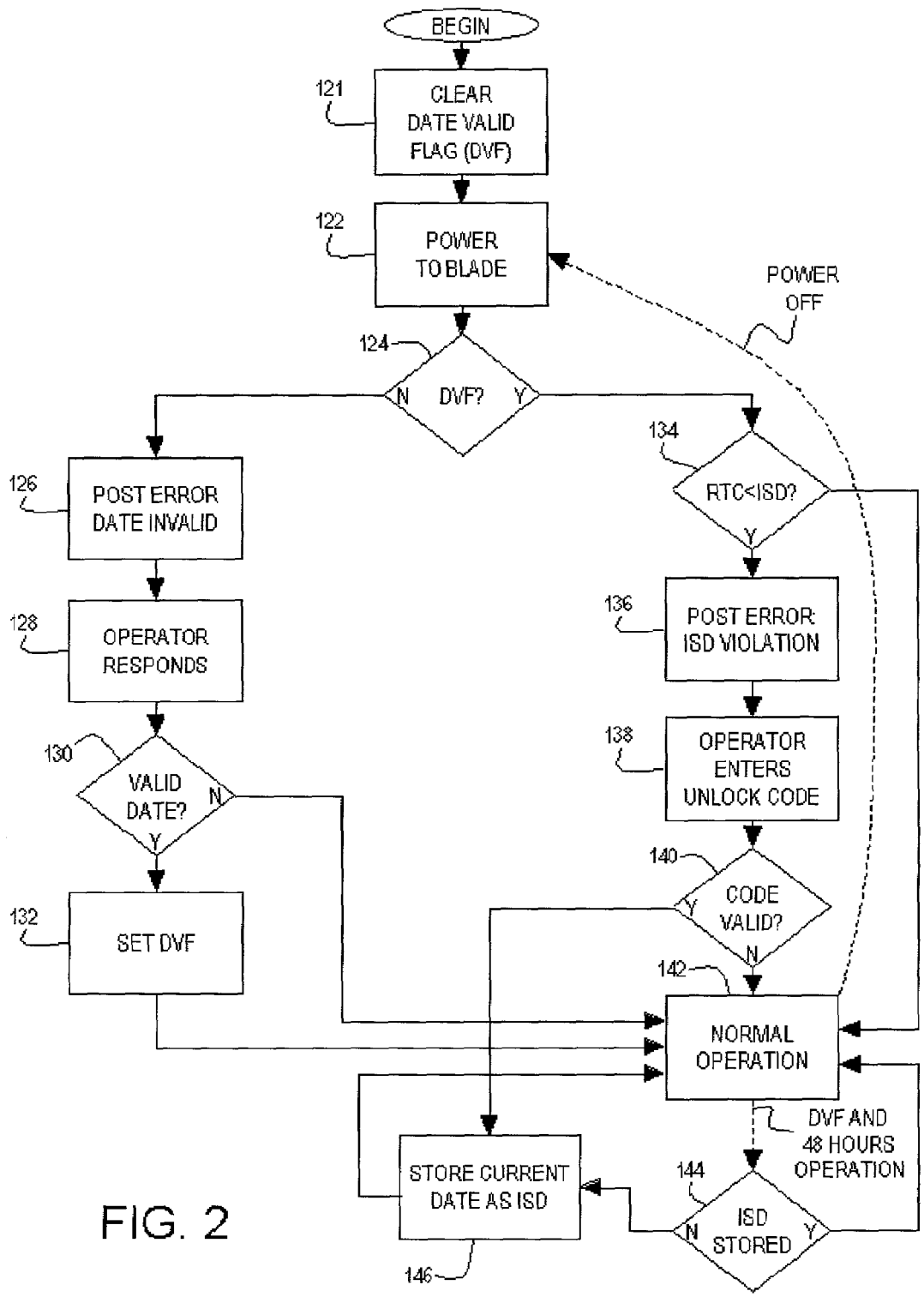
FIG. 2 is a flow diagram of a method for establishing and preserving date information, such as the in-service date, of an electronic device according to one embodiment of the present invention.

Turning now to FIG. 2, a flow diagram of a method 120 for generating and maintaining date information associated with a system according to one embodiment of the invention is depicted. Generally speaking method 120 includes determining if a valid date has been set for the system. If a valid date has been set, date/time information is subsequently retrieved from the system. The retrieved date information is then used to determine a date representing, for example, the date the device was first in-service (i.e., the in-service date or ISD). The determined date is then stored in a storage location that is preferably both externally accessible and secure from being fraudulently modified. In the event of a system failure, the determined date may be retrieved externally using an external device connected to the system to determine, for example, whether the system is within its warranty period.

In the depicted embodiment of method 120, the manufacturer may initially configure the system to indicate that a valid date has not been set for the system. In one embodiment this initial configuration is accomplished by clearing (block 121) a date valid flag (DVF) in the system. The DVF is typically located within the system's non-volatile storage and more particularly within non-volatile storage that is accessible to the system's main processor(s) 102. When the system is subsequently powered-on (block 122), a boot program or operating system routine, such as the power on self test (POST), may read the DVF to determine (block 124) if a valid date has been set previously. If the DVF is clear (i.e., FALSE), the POST may issue (block 126) an error message indicating that the system date is invalid.

Upon receiving a POST date invalid message, the system operator is typically prompted to make some form of response. The operator typically responds (block 128) by either entering a valid date or bypassing the error message. If the system determines (block 130) that a valid date has been entered, the DVF is set (block 132). Regardless of whether a valid system date is set (i.e., whether the DVF is TRUE), the system typically enters a normal operating mode represented in FIG. 2 by reference numeral 142. In an embodiment where the system is a server blade, motherboard, or the like, the normal operating mode typically refers to a state in which the system's operating system is installed and functioning and application programs may be loaded and executed.

In one embodiment, the system is configured to set the date information of interest automatically after a valid date has been established. For the remainder of this disclosure, the system's in-service date or ISD will be used as an example of the date information of interest. As depicted in FIG. 2, the system may be configured to launch a routine to establish the ISD if the DVF is true (i.e., a valid date is set) and the system has been in normal operating mode for a specified period of time (such as 48 hours depicted in FIG. 2).

In the example of a server blade such as system 100 depicted in FIG. 1, the initiation of the ISD routine may comprise a cooperative effort between the main processor(s) 102 and the service processor 115. Typically, the main processor(s) 102 and/or the system operating system will control the system date settings. The determination of when 48 hours of normal operation has occurred, however, is preferably delegated to the service processor to minimize the impact of the present invention on operating system code, which is typically rigorously specified and frequently controlled by a third party. In one embodiment, the ISD itself is maintained in non-volatile storage associated with service processor 115 and inaccessible to main processor(s) 102.

In the embodiment depicted in FIG. 2, the ISD routine launched after 48 hours of normal operation assuming a valid date is entered first determines (block 144) whether the ISD has been stored previously. The ISD may itself comprise one or more bytes of information that indicate a particular date. The system may incorporate an ISD flag (analogous to the DVF) comprising a single bit that indicates whether the ISD byte(s) contain a valid date. In this embodiment, the ISD routine may determine whether the ISD is valid by reading the ISD flag. If the system determines that the ISD is valid, the ISD routine is exited and normal operating mode is resumed. If, however, the ISD is determined to be invalid or otherwise "un-set," the ISD routine may read the current date/time and store (block 146) the current time as the ISD prior to returning to normal operating mode. In an embodiment, where the ISD has an associated flag, the ISD routine will also set the ISD flag prior to returning to normal operating mode. The system may thereafter launch the ISD routine periodically to insure that the ISD remains valid.

The system as described above thus establishes an ISD automatically, without operator intervention, shortly after a valid system date is established. Although the flow diagram depicted in FIG. 2 indicates that it is not necessary to establish a valid system date to enter normal operating mode, the ability to accurately maintain file dates and other time sensitive information provide a strong independent motivation for entering a valid date that will ensure the entry of a valid date in the vast majority of systems.

Once normal operating mode, a valid date, and a valid ISD are established, the system may continue within block 142 as long as power is supplied. When power is interrupted however, the system transitions from normal operating mode to an off state. When power is subsequently resumed, the system transitions back to block 122 and the POST or other code sequence determines that the DVF is FALSE, operation continues to block 126 as described above. If a valid date is set, however, the depicted embodiment of the system will verify that the system date has not been modified in a manner indicating an attempt to extend the warranty period fraudulently.

In the depicted embodiment, fraud is detected by first comparing (block 134) the current ISD and the current valid date. Under no circumstances should the current date be earlier than the in-service date, which is typically established shortly after power is applied to the system for the first time. If the system determines in block 134 that the current date, as indicated by the system's real time clock (RTC) is less than (i.e., earlier than) the ISD, the system then assumes that an attempt to wrongfully extend the warranty period has been attempted and permits the operator a limited opportunity to amend the problem to reflect an accurate ISD.

The system assumes that a Real Time Clock date that is earlier than the ISD date may be an attempt to extend the warranty because a system administrator who becomes aware that the ISD is established 48 hrs after the device in placed in service could extend the warranty by initially setting an incorrect, future date and allowing the ISD to be saved. With the ISD set to a future date, the warranty of the device would end some predetermined time after this future date. However, for the purposes of correctly time-stamping files, the administrator would most likely reset the RTC date back to the correct date once the ISD has been saved. This results in a situation where the RTC date appears to be earlier than the date that the device was placed in service.

Following the determination of a "post-dated" ISD (i.e., an ISD later in time than the RTC), the system may issue (block 136) a POST error message indicating an ISD violation and prompt the operator to enter (block 138) a code (referred to as an unlocking code) to correct the problem. In one embodiment, the unlocking code is available only from a representative of the manufacturer. Before telling the operator what the unlocking code is, the manufacturer could determine whether the error occurred through deceptive intent or, as is possible, through an unintended and erroneous entry of time by the operator. The unlocking code may be determined algorithmically based upon, for example, the serial number of the server, the ISD currently stored in the server and the date reported by the server's real-time clock. The server may include code to perform the same algorithm such that an unlocking code provided by the manufacturer matches the code determined by the server. This system beneficially produces an unlocking code that is valid on only a single system, is only good for one use since changing the ISD will alter the result of the algorithm, and the unlocking code can only be used to change the ISD to the same date as the customer calls.

In any event, the system will determine (block 140) whether the unlocking code entered by the operator is correct. If the code is not entered or not correct, the depicted embodiment of the system simply transitions to the normal operating mode. If the code is correct however, the system will invoke the portion of the ISD routine described previously that retrieves the current date from the RTC and sets the ISD to the retrieved date/time. Although this flow permits a system having a post-dated ISD to function in normal operating mode, the system will encounter one or more POST messages every time it is booted. It is theorized that the desire to eliminate POST error messages every time the system is powered will motivate proper entry of date/time information in the majority of cases. Also, the manufacturer could publicize that the warranty will not be honored if the system presents the specific POST error code that corresponds to a manipulation of the ISD.

Once a device has failed or otherwise requires a warranty repair action, it becomes necessary for the servicer to examine the ISD and determine if the device is still covered by the manufacturer's warranty. In the simplest case, enough of the device remains functional that the servicer can use the processor and display facilities of the device to recall and display the ISD. (For example, the servicer may be able to request the ISD by using the keyboard of a server and a CRT attached to the server in conjunction with special POST software to display the ISD, even though the server is displaying a POST error message that indicates a problem with a portion of main memory.) However, it is anticipated that there will also be times when the device is either totally non-functional or substantially non-functional to the point where the servicer cannot display the ISD without additional tools.

Figure 3:
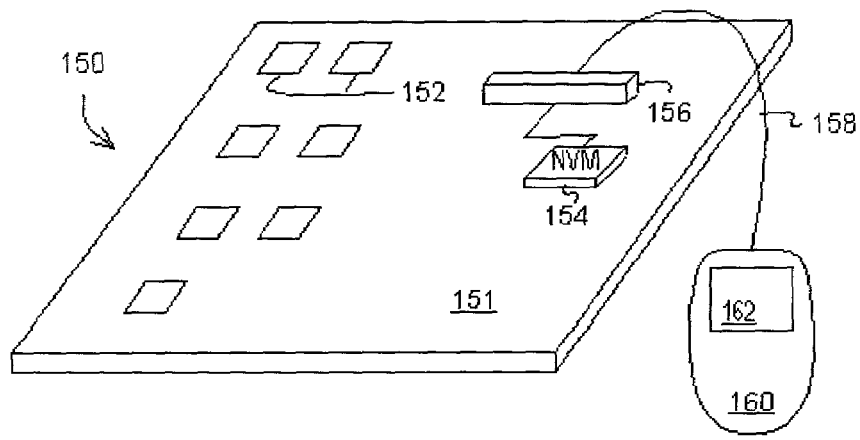
FIG. 3 illustrates an embodiment of the present invention employing a readout device configured to access the stored date information externally.
Figure 4:
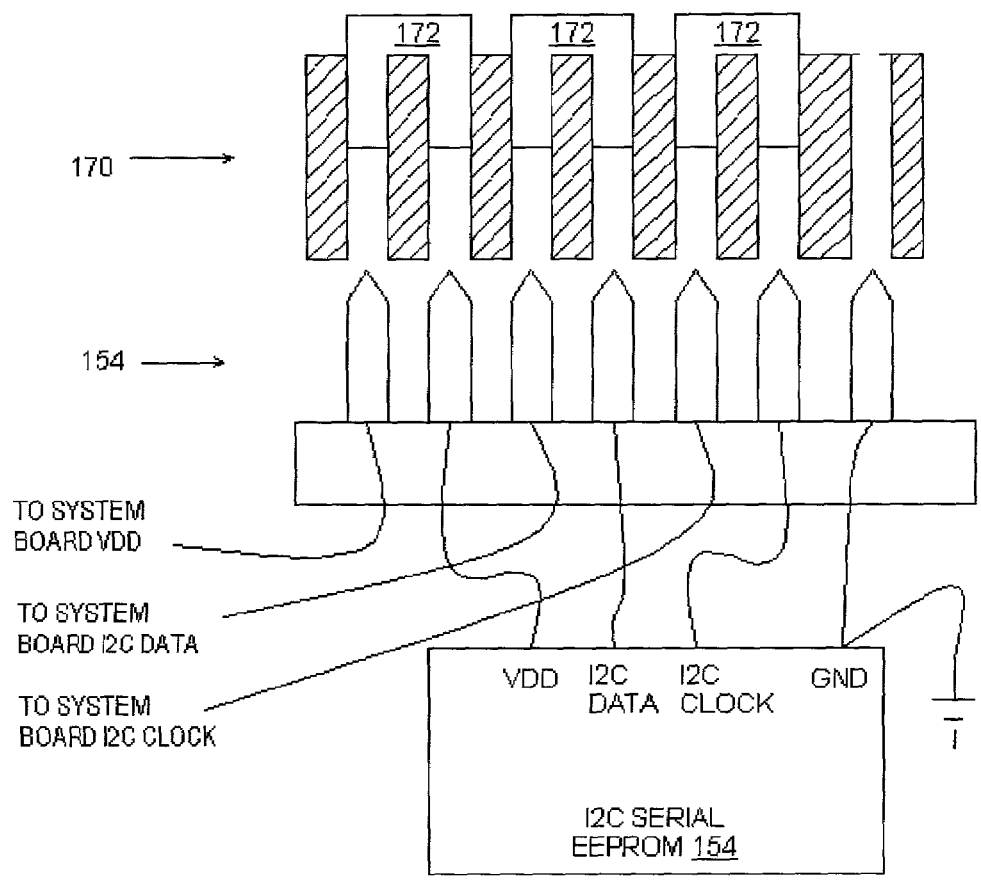
FIG. 4 illustrates an embodiment of a connector/jumper configuration suitable for use with one embodiment of the invention during a normal operating mode.
Figure 5:
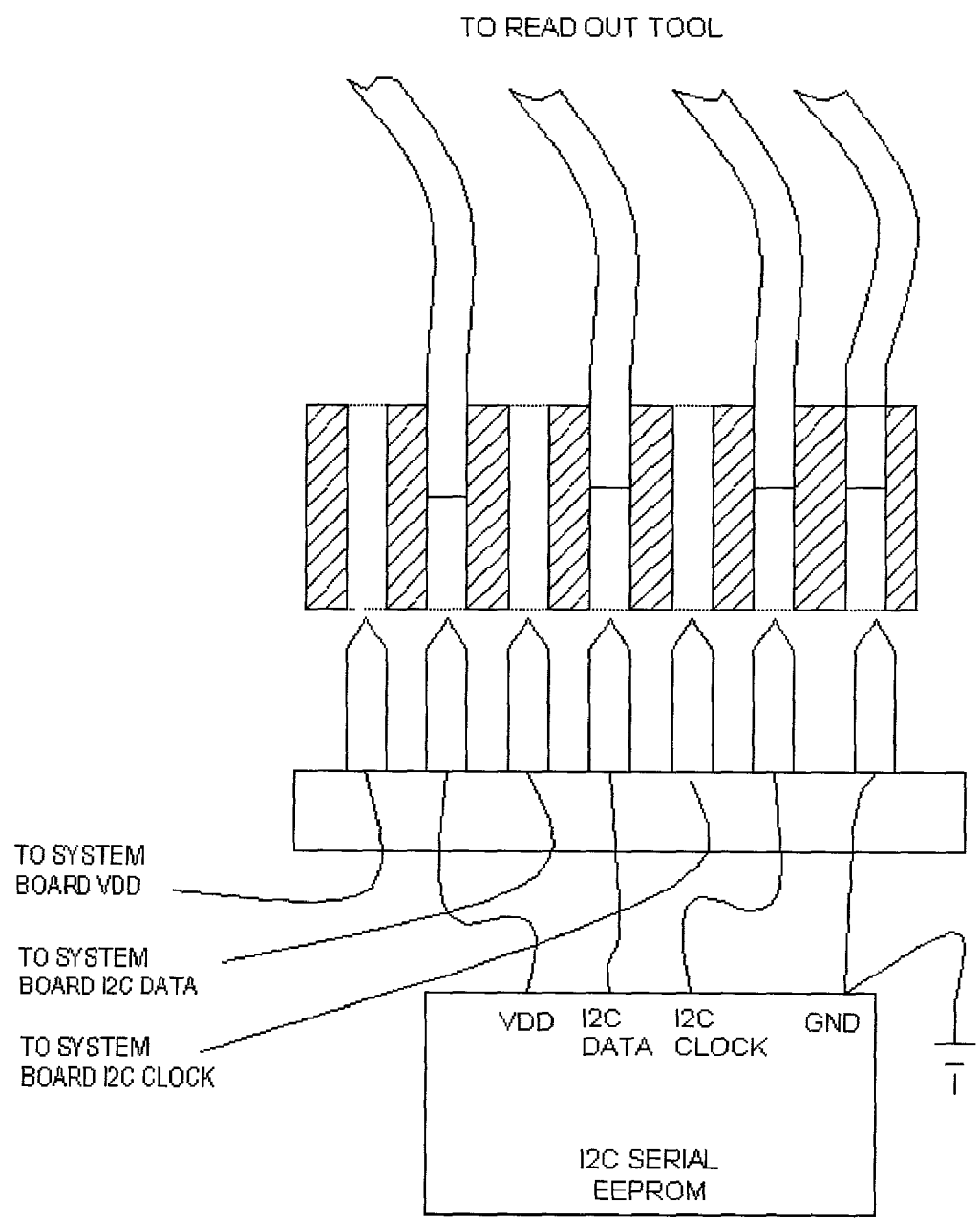
FIG. 5 illustrates an embodiment of a connector/jumper configuration suitable for use with one embodiment of the invention during an external readout of the date information.

Referring now to FIG. 3, FIG. 4, and FIG. 5, features of the invention according to one embodiment are presented to illustrate the system's capability for retrieving the ISD information externally and independently of the state of main processors 102. Generally speaking, this feature of the invention contemplates storage of the ISD information in a device that includes a port for powering and accessing the contents of the device via a communication bus. This ability beneficially enables retrieval of ISD even in cases where the majority or all of the system has failed.

FIG. 3 illustrates an exemplary server blade 150 suitable for use with one embodiment of the invention. Server blade 150 includes a set of integrated circuit components 152 (some or all of which may include main processor(s) 102 attached to a printed circuit board 151. A non-volatile storage device (NVM) 154 is connected to circuit board 151 and includes the ISD information established as described above with respect to FIG. 2. The NVM 154 is connected to a connector 156 configured to facilitate communications with an external readout device 160. As depicted in FIG. 4, connector 156 may comprise a male polarity connector having a set of prongs suitable for making electrical connections to a corresponding female polarity connector.

In the depicted embodiment, NVM 154 is implemented with an EEPROM device having suitable I2C connectors. I2C (also referred to as I²C) is a relatively simple 2-wire (plus power signals) communication bus developed by Philips that is widely used to interconnect integrated circuits. When the system is in normal operating mode, the I2C pins on NVM 154 are connected via a set of jumpers 172 in a female polarity connector 170 to the corresponding I2C signals on server blade 150. As depicted in FIG. 5, female connector 170 is configured to permit removal of jumpers 162 and the subsequent attachment of connections to a readout device 160 that includes an I2C port and is configured to retrieve information from an I2C device and display the retrieved information. Because the I2C communication bus includes power signals, readout device 160 is able to access the ISD information whether power to the server blade is available or not. Thus, the in-service date could be determined using readout device 160 on a server blade that has been removed from its system.

It will be apparent to those skilled in the art having the benefit of this disclosure that the present invention contemplates a system and method for establishing and maintaining date information such as the in-service date of a date processing system or other electronic device. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for recording an in-service date associated with an electronic device, comprising:
   establishing an initial valid date as the current date for the device and maintaining the current date thereafter;
   responsive to determining that the device is in service and that no in service date has been stored previously, storing the current date as the in-service date; and
   performing an action selected from:
     periodically monitoring the current date of the device to determine if the valid date has been altered after storing the in-service date; and
     obtaining the in-service date from the non-volatile device with an external readout machine connected to the non-volatile storage;
   responsive to determining that the initial valid date has not been established, generating a valid date error message before transitioning to a normal operating mode in which the user is enabled to operate the device; and
   responsive to determining that the in service date is after the current date, issuing an in service data error message before transitioning the system to a normal operating mode.

2. The method of claim 1, wherein establishing the valid date comprises entering the current date during a power on sequence of the device.

3. The method of claim 1, wherein determining that the device is in service comprises determining that the device has been operating for a predetermined length of time after the valid dare is set.

4. The method of claim 1, wherein storing the current date in non-volatile storage comprises storing the current date in a non-volatile storage device of a service processor of the device such that the stored date is inaccessible to a main processor of the device.

5. The method of claim 1, wherein periodically monitoring the valid date, comprises periodically determining if the valid date is earlier than the in-service date.

6. The method of claim 5, further comprising, responsive to determining that the current date is earlier than the in-service date, issuing an error message.

7. The method of claim 6, Further comprising, responsive to determining that the current date is earlier than the in-service date, enabling alteration of the in-service to match the current date.

8. The method of claim 7, wherein enabling the alteration includes requiring an operator of the device to enter a unlocking code.

9. The method of claim 1, wherein obtaining the in-service date via the readout machine comprises executing an I2C compliant communication between the readout machine and the non-volatile memory.

10. A data processing system, comprising:
    a main processor having access to a system memory;
    a real-time clock configured to maintain the current date upon being initialized with a valid date;
    non-volatile storage; and
    a set of processor executable instructions at least a portion of which are contained in the system memory, wherein the instructions are configured to store the current date in the non-volatile storage as the in-service date automatically;
    wherein the system is further confirmed to issue an error message, prior to transitioning to a normal operating mode in which the user is able to operate the device, responsive to determining that the current date has been altered after storing the in-service date.

11. The system of claim 10, wherein determining if the current date is altered after storing the in-service date comprises periodically monitoring the current date to determine if the current date is earlier than the in-service date.

12. The system of claim 10, wherein the contents of the non-volatile storage device are externally accessible.

13. The system of claim 12, further comprising an external readout device configured to access the contents of the non-volatile storage via a communication bus.

14. The system of claim 13, wherein the communication bus includes power signals such that the readout device can access the contents red.

15. The system of claim 14, wherein the communication bus comprises an I2C communication bus.

16. The system of claim 10, further comprising a service processor connected to the main processor, wherein the non-volatile storage device comprises a non-volatile storage device of the service processor that is inaccessible to the main processor.

17. The system of claim 10, wherein the processor executable instructions are further configured to enable alteration of the in-service to march the current date responsive to determining that the current date is earlier than the in-service date.

18. The system of claim 17, enabling alteration of the in-service date requires an operator of the device to enter a unlocking code.

19. The system of claim 18, wherein requiring the operator to enter a unlocking code includes requiring rho operator to obtain the unlocking code from a manufacturer of the device.

20. A computer program product comprising computer executable instructions, stored on a computer readable storage medium for maintaining an in service date (ISD) representative of the date on which an electronic device is placed in service, comprising:
  instructions for determining, upon powering on the electronic device, whether a valid date has ever been entered into the electronic device;
  instructions for prompting a user to enter a valid date responsive to determining that no valid date has ever been entered into the device;
  instructions for setting a date valid flag (DVF) responsive to entry of a valid date into the device;
  instructions for determining the current date and storing the current date as the ISD responsive to determining that (a) the DVF is TRUE, (b) the electronic device has been functioning for a specified duration, and (c) the ISD is not currently stored;
  instructions for preventing a user from altering the ISD, once established, by issuing an ISD error message responsive to determining that the ISD is after the current date, before transitioning the system to a normal operating mode, without entering an unlocking code obtained from the manufacturer of the device.

21. The computer program product of claim 20, wherein the instructions for preventing a user from altering the ISD include instructions for enabling the user to operate the device despite the absence of a valid ISD.

* * * * *